(12) United States Patent
Hu et al.

(10) Patent No.: US 11,087,116 B2
(45) Date of Patent: Aug. 10, 2021

(54) METHOD AND APPARATUS FOR DETERMINING FINGERPRINT COLLECTION REGION

(71) Applicant: BEIJING XIAOMI MOBILE SOFTWARE CO., LTD., Beijing (CN)

(72) Inventors: Xiankun Hu, Beijing (CN); Ju Tang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,504

(22) Filed: Nov. 29, 2019

(65) Prior Publication Data
US 2020/0293746 A1    Sep. 17, 2020

(30) Foreign Application Priority Data
Mar. 14, 2019  (CN) .......................... 201910193012.3

(51) Int. Cl.
*G06K 9/00* (2006.01)
*G06F 3/041* (2006.01)

(52) U.S. Cl.
CPC ......... *G06K 9/00087* (2013.01); *G06F 3/041* (2013.01); *G06F 2203/04101* (2013.01)

(58) Field of Classification Search
None
See application file for complete search history.

(56) References Cited

U.S. PATENT DOCUMENTS

| | | | |
|---|---|---|---|
| 9,734,379 B2 | 8/2017 | Tuneld et al. | |
| 9,767,338 B2 | 9/2017 | Yoon et al. | |
| 10,725,578 B2 | 7/2020 | Lee et al. | |
| 2012/0076370 A1 | 3/2012 | Lei et al. | |
| 2015/0135108 A1* | 5/2015 | Pope | A63F 13/2145 715/767 |
| 2015/0139511 A1 | 5/2015 | Yoon et al. | |
| 2016/0063298 A1 | 3/2016 | Tuneld et al. | |
| 2016/0171281 A1 | 6/2016 | Park et al. | |
| 2018/0224999 A1* | 8/2018 | Lee | G06F 3/0488 |
| 2018/0253614 A1 | 9/2018 | Lee et al. | |
| 2019/0340414 A1 | 11/2019 | Vaezi Joze | |

(Continued)

FOREIGN PATENT DOCUMENTS

| | | |
|---|---|---|
| CN | 107194331 A | 9/2017 |
| CN | 107704744 A | 2/2018 |

(Continued)

OTHER PUBLICATIONS

European Patent Office, Extended European Search Report Issued in Application No. 19213338.7, dated Jun. 8, 2020, Germany, 9 pages.

(Continued)

*Primary Examiner* — Nicholas J Lee
(74) *Attorney, Agent, or Firm* — Syncoda LLC; Feng Ma

(57) ABSTRACT

A method of determining a fingerprint collection region includes: determining a contact region according to a touch signal generated by a touch operation from a starting moment t0 of sensing the touch operation; determining a change rate of a feature parameter of the contact region; and determining the fingerprint collection region according to the contact region when the change rate is smaller than or equal to a preset change rate.

18 Claims, 10 Drawing Sheets

(56) References Cited

U.S. PATENT DOCUMENTS

| | | |
|---|---|---|
| 2020/0184171 A1 | 6/2020 | Lee et al. |
| 2020/0234027 A1 | 7/2020 | Han et al. |
| 2020/0242317 A1 | 7/2020 | Hu |
| 2020/0242326 A1 | 7/2020 | Lee et al. |
| 2020/0242328 A1 | 7/2020 | Chung et al. |
| 2020/0293746 A1 | 9/2020 | Hu et al. |

FOREIGN PATENT DOCUMENTS

| | | |
|---|---|---|
| EP | 3032385 A1 | 6/2016 |
| EP | 3153989 A1 | 4/2017 |
| EP | 3358455 A1 | 8/2018 |
| EP | 3396515 A1 | 10/2018 |
| WO | 2013173838 A2 | 11/2013 |

OTHER PUBLICATIONS

European Patent Office, Extended European Search Report Issued in Application No. 19216905.0, dated Jul. 17, 2020, Germany, 11 pages.

\* cited by examiner

METHOD AND APPARATUS FOR DETERMINING FINGERPRINT COLLECTION REGION

CROSS-REFERENCE TO RELATED APPLICATION

This application claims priority to Chinese Patent Application No. 201910193012.3 filed on Mar. 14, 2019, the disclosure of which is hereby incorporated by reference in its entirety.

BACKGROUND

With the development of fingerprint identification technologies, under-screen fingerprint identification are realized in many terminal devices, where fingerprint identification can be performed by using fingerprint identification sensors disposed in a display region of the terminal device.

SUMMARY

The present disclosure relates generally to the field of fingerprint identification technologies, and more specifically to a method and an apparatus for determining a fingerprint collection region, an electronic device, and a computer readable storage medium.

According to a first aspect of the present disclosure, a method of determining a fingerprint collection region is provided. The method includes: determining a contact region according to a touch signal generated by a touch operation from a starting moment t0 of sensing the touch operation; determining a change rate of a feature parameter of the contact region; and determining the fingerprint collection region according to the contact region when the change rate is smaller than or equal to a preset change rate.

According to a second aspect of the present disclosure, there is provided an apparatus for determining a fingerprint collection region. The apparatus includes: a contact region determining module, configured to determine a contact region according to a touch signal generated by a touch operation from a starting moment t0 of sensing the touch operation; a change rate determining module, configured to determine a change rate of a feature parameter of the contact region; and a collection region determining module, configured to determine the fingerprint collection region according to the contact region when the change rate is smaller than or equal to a preset change rate.

According to a third aspect of the present disclosure, an electronic device is provided. The electronic device includes: one or more processors; and a memory for storing processor executable instructions. The one or more processors are configured to determine a contact region according to a touch signal generated by a touch operation from a starting moment t0 of sensing the touch operation; determine a change rate of a feature parameter of the contact region; and determine the fingerprint collection region according to the contact region when the change rate is smaller than or equal to a preset change rate.

According to a fourth aspect of the present disclosure, a computer readable storage medium storing computer programs is provided, where the programs are executed by one or more processors to determine a contact region according to a touch signal generated by a touch operation from a starting moment t0 of sensing the touch operation; determine a change rate of a feature parameter of the contact region; and determine the fingerprint collection region according to the contact region when the change rate is smaller than or equal to a preset change rate.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of the present disclosure, illustrate examples consistent with the present disclosure and serve to explain the principles of the present disclosure together with the specification.

DETAILED DESCRIPTION

Figure 1:
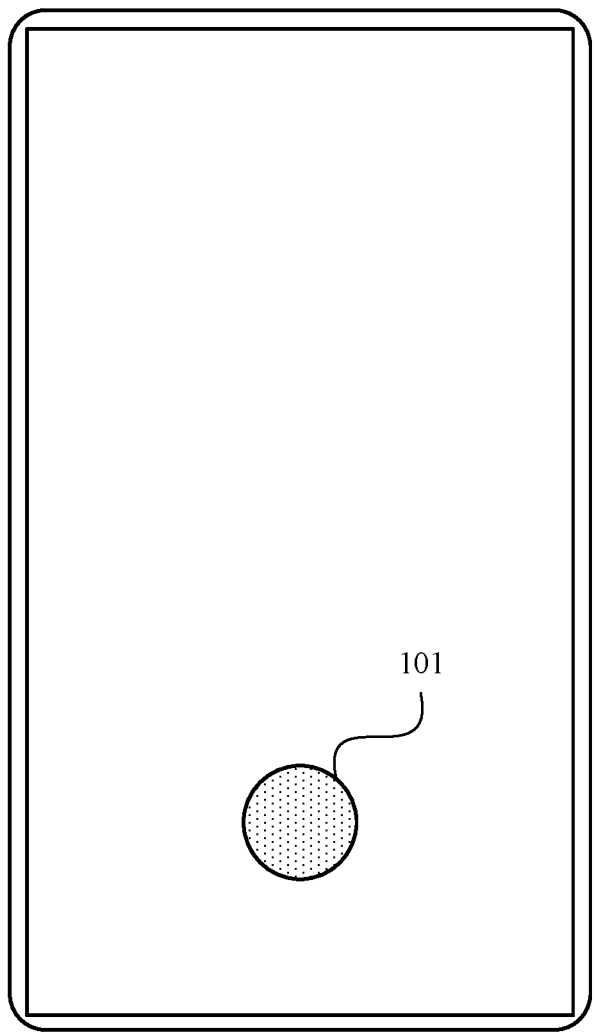
FIG. 1 is a schematic diagram illustrating a mobile phone having a fingerprint collection region according to some embodiments.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The manner of performing fingerprint identification can be limited on a mobile device such as a mobile phone. For example, in determining a contact region by a user on a terminal device, a "gravity" center of the contact region is determined, typically by calculating a weighted average of touch signals. However, because the user may apply a different force at various positions of a finger when touching a terminal device, the gravity center determined in this way may not coincide with an actual center (centroid) of the contact region.

When the gravity center is located in a fingerprint identification region, a circular region is determined with the gravity center as a center of the circle based on a fixed radius, and all fingerprint identification sensors within the circular region are started to perform fingerprint identification. For example, as shown in FIG. 1, when a gravity center of a contact region is located in a fingerprint collection region, the gravity center is taken as the center, a circular region 101 is determined with the gravity center as the center of the circular region based on a fixed radius so that fingerprints within the circular region 101 are identified.

However, since the gravity center may not coincide with the center of the contact region, the contact region within the circular region may be a small part of a contact region between the user and the terminal device, resulting in incomplete collected fingerprint information. For example, when the user performs a fingerprint identification operation, a shape of the contact region between a finger and a screen is not circular.

Figure 2:
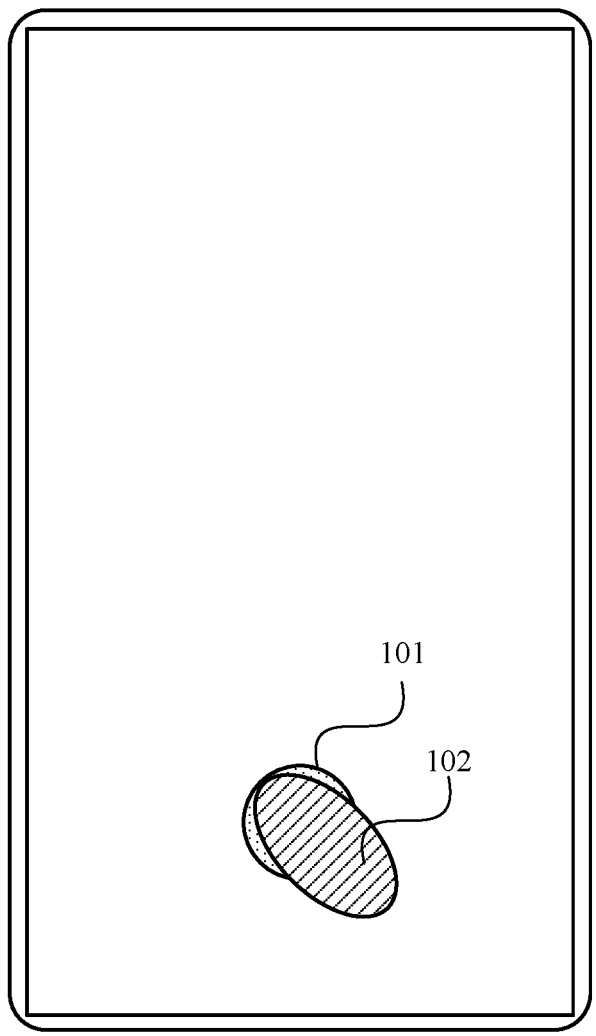
FIG. 2 is a schematic diagram illustrating a relationship of a contact region and a fingerprint collection region on a mobile phone according to some embodiments.

For example, as shown in FIG. 2, the shape of the contact region 102 between the finger of the user and the terminal device is elliptical, and the contact region may not cover the circular region in the fingerprint collection region, so that a gap exists between the contact region and the circular region. When all fingerprint identification sensors, for example, photosensors, within the circular region are started, since the photosensors at the gap are not blocked by the finger, and the light leakage will be observed by the user in the case shown in FIG. 2, thereby affecting the use experiences. Further, the collected fingerprint information may not cover even a half of the contact region, resulting in the incomplete collected fingerprint information.

Figure 3:
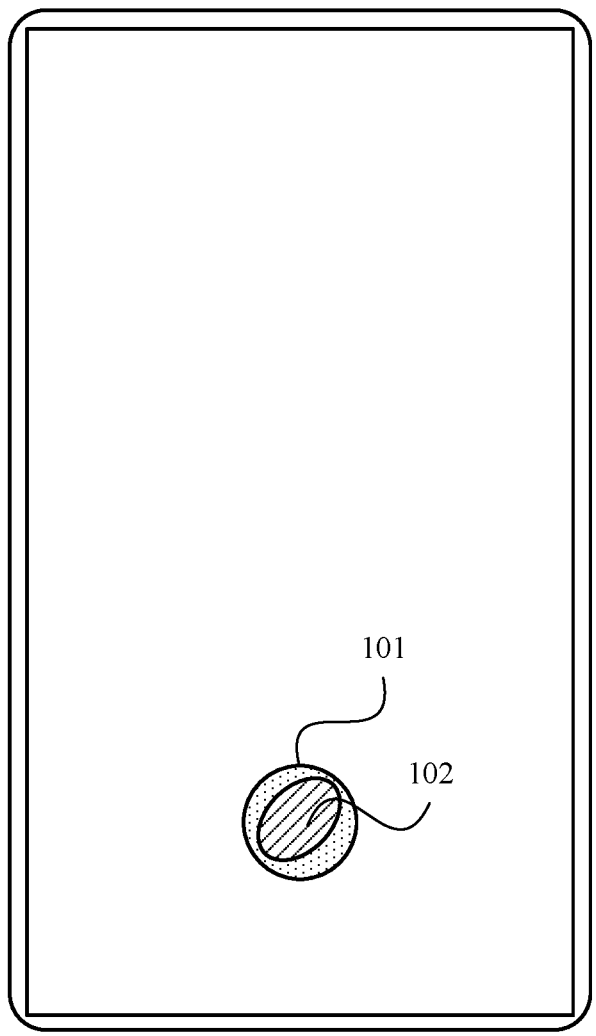
FIG. 3 is a schematic diagram illustrating another relationship of a contact region and a fingerprint collection region on a mobile phone according to some embodiments.

Even if the contact region 102 is completely located within the circular region 101 as shown in FIG. 3, since the radius of the circular region 101 is fixed, the user can only contact the fingerprint collection region with a part of the finger, for example, a fingertip. As a result, the light leakage problem indicated in FIG. 2 still exists, and less fingerprint information is collected, which is not desirable for the fingerprint identification.

Figure 4:
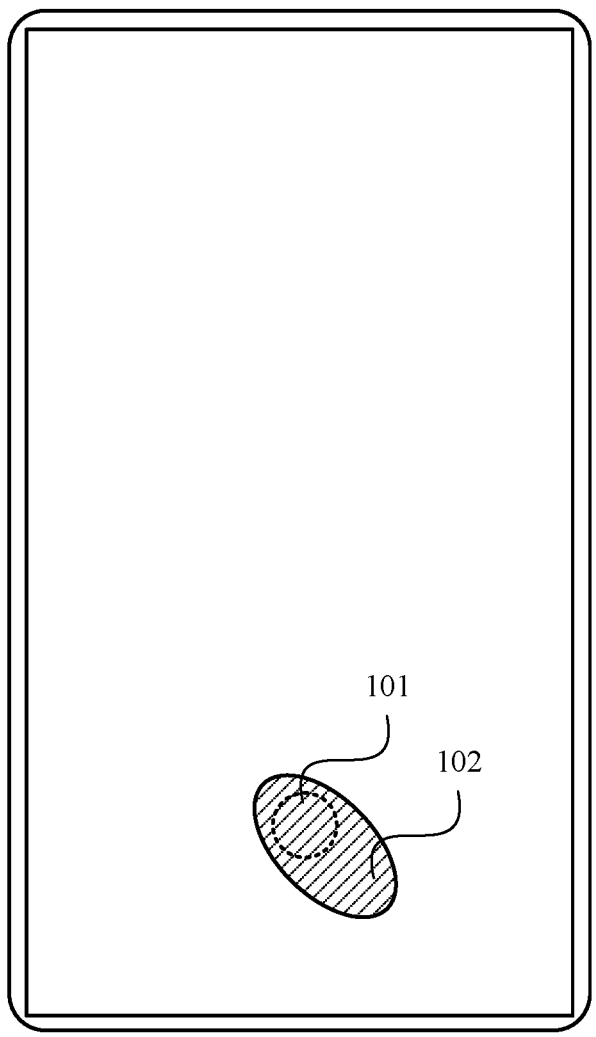
FIG. 4 is a schematic diagram illustrating still another relationship of a contact region and a fingerprint collection region on a mobile phone according to some embodiments.

If the circular region is reduced to avoid the light leakage problem as shown in FIG. 4, since the circular region 101 (a region indicated by a dotted line) located in the contact region 102 is a small area, and less fingerprint information is collected, which affecting the fingerprint identification.

Figure 5:
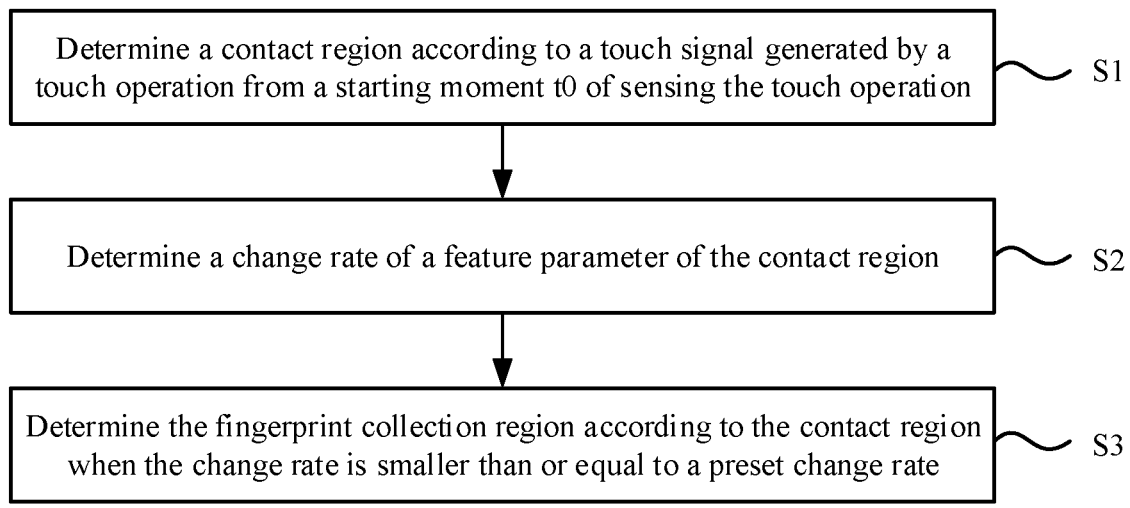
FIG. 5 is a flowchart illustrating a method of determining a fingerprint collection region according to some embodiments of the present disclosure.

FIG. 5 is a flowchart illustrating a method of determining a fingerprint collection region according to some embodiments of the present disclosure, which can be applied to or improve upon various devices such as the mobile phones illustrated in FIGS. 1-4, or other terminal devices such as a mobile phone, a tablet computer and a wearable device. The terminal device includes a touching circuit and a fingerprint identifying circuit. The touching circuit may include a plurality of touch sensors and a touch processor, and the fingerprint identifying circuit may include a plurality of fingerprint identification sensors and a fingerprint identification processor.

The touch sensors include but are not limited to mutual-inductive capacitive sensors and self-inductive capacitive sensors, and a specific type of the sensors may be selected according to requirements. The fingerprint identification sensors include but are not limited to photosensors and ultrasonic sensors, and a specific type of the sensor may be selected according to requirements.

In some embodiments, the terminal device may further include a display panel having touch sensors and the fingerprint identification sensors thereon.

It is noted that a region where the fingerprint identification sensors are disposed in some embodiments of the present disclosure may be far larger than a region where the fingerprint identification sensors are disposed in the related art.

For example, as shown in FIG. 1, the region where the fingerprint identification sensors are disposed in the related art is a small region with a fixed shape and size at a lower half portion of the display panel. When fingerprint registration or fingerprint identification is performed, all the fingerprint identification sensors within the region are started.

However, a region where the fingerprint identification sensors are disposed in some embodiments of the present disclosure may be a half region of the display panel or even the entire display panel. In this case, when fingerprint registration or fingerprint identification is performed, only the fingerprint identification sensors in the fingerprint collection region within the region are started.

In the related art, to avoid collecting the fingerprint of an unintentional touch, whether a contact area is greater than a preset area is determined before the fingerprint collection region is determined. When the contact area is greater than the preset area, it is determined that the user does not touch unintentionally, so that the fingerprint collection region is to be determined, and the fingerprint is collected through the fingerprint identification sensors within the fingerprint collection region.

However, there is a problem in the existing way of determining whether the user unintentionally touches the terminal device according to the contact area. Since different human fingers have different widths and lengths, the contact areas between the finger and the terminal device may also be different. Some users do not unintentionally touch the terminal device, but the contact area between the finger and the terminal device is small. If the preset area is taken as a determination criterion, an operation of an intentional touch of the user may be determined as an unintentional touch. Then, the fingerprint will not be collected, resulting in no response to the operation of the user and affecting the use experience.

As shown in FIG. 5, the method of determining a fingerprint collection region may include the following steps S1-S3.

At step S1, a contact region is determined according to a touch signal generated by a touch operation from a starting moment t0 of sensing the touch operation.

At step S2, a change rate of a feature parameter of the contact region is determined.

At step S3, the fingerprint collection region is determined according to the contact region if the change rate is smaller than or equal to a preset change rate.

In some embodiments, the contact region may be determined according to the touch signals generated by the touch operation from the starting moment t0 of sensing the touch operation. Touch sensors may sense the touch operation and generate the touch signals. The contact region may be obtained by performing fitting according to the positions of the touch sensors generating the touch signals. For example, if the contact region is elliptical, determining the contact region includes determining at least the following four pieces of information: a length of an elliptical major axis, a length of an elliptical minor axis, a position of a center point and an included angle between the major axis and a terminal bezel or an included angle between the minor axis and the terminal bezel.

A position, a shape and an area of the contact region and an inclination angle of the contact region relative to the terminal bezel are determined according to the above four pieces of information, then the contact region may be determined accurately. The change rate of the feature parameter of the contact region may include a change rate of a contact region stress, a change rate of the elliptical major axis and a change rate of the elliptical minor axis. The change rate refers to a change in length within a unit time. In this example, the length may be represented by the number of touch sensors or the number of pixels. For example, if the length is represented by the number of pixels, the preset change rate may be set to 3 pixels/100 milliseconds.

The feature parameter of the contact region may change, for example, in stress and contact area, from a moment at which a finger of the user starts to contact the terminal device to a moment at which the finger completely presses on the terminal device. The change rate of the feature parameter of the contact region may be determined in this example. Take the change rate of the feature parameter of the contact region is the change rate of the area of the contact region as an example. If the change rate is smaller than or equal to the preset change rate, it indicates that the contact region tends to be stable, and the area of the contact region remains substantially unchanged as well. The fingerprint collection region may be determined according to the contact region (that is, the contact region determined when the change rate is smaller than or equal to the preset change rate). Therefore, it is ensured that the determined contact region coincides with the contact region when the finger of the user completely presses on the terminal device. Further, it is ensured that the fingerprint collection region coinciding with the contact region when the finger of the user completely presses on the terminal device may be determined according to the determined contact region, and the fingerprint information may be completely collected by starting the fingerprint identification sensors in the fingerprint collection region.

According to some embodiments of the present disclosure, it is not required to take the preset area as the determination criterion, which is helpful to avoid determining an operation of an intentional touch of the user as an unintentional touch.

According to some embodiments of the present disclosure, the determined fingerprint collection region coincides with the contact region when the finger of the user completely presses on the terminal device and the fingerprint collection region (the contact region) is a region covered by the finger of the user. Thus, even if the fingerprint identification sensors in the fingerprint collection region are photosensors, light emitted by the photosensors is still blocked by the finger of the user without light leakage, thereby improving the use experiences.

According to some embodiments of the present disclosure, since all fingerprint identification sensors in the fingerprint collection region are controlled to perform fingerprint identification, all fingerprints of the fingerprint collection region may be identified, which helps to collect more fingerprint information and facilitate subsequent operations such as fingerprint identification and fingerprint authentication.

The shape, position and area of the determined fingerprint collection region may be same as the shape, position and area of the contact region, and the inclination angle relative to the terminal bezel of the determined fingerprint collection region may be same as the inclination angle relative to the terminal bezel of the contact region. After the fingerprint collection region is determined, fingerprint identification may be performed by triggering the fingerprint identification sensors in the fingerprint collection region.

Preferably, the area of the contact region may also be considered in some embodiments of the present disclosure. The fingerprint collection region is determined according to the contact region when the area of the contact region is greater than or equal to a preset area and the change rate is smaller than or equal to a preset change rate. The preset area may be a small area, and may be represented by the number of touch sensors or the number of pixels. When the area of the contact region is smaller than the preset area, for example, the area of the contact region is smaller than 10 pixels, it may be determined that the touch signals in the contact region is not generated by a user contacting the terminal device for collecting the fingerprint, which may be noise signals or an unintentional touch on the terminal device. Therefore, it is not required to determine the fingerprint collection region according to the contact region, reducing consumption of resources.

Preferably, the feature parameter is used to represent the area of the contact region.

In some embodiments, the feature parameter used for representing the area of the contact region, in a case that the contact region is approximate to an ellipse, the feature parameter may include an elliptical major axis and an elliptical minor axis. When the change rate of the feature parameter is smaller than or equal to the preset change rate, it may be more intuitively concluded that the area of the contact region tends to be stable, thereby it can determine the fingerprint collection region more accurately according to the contact region.

Figure 6:
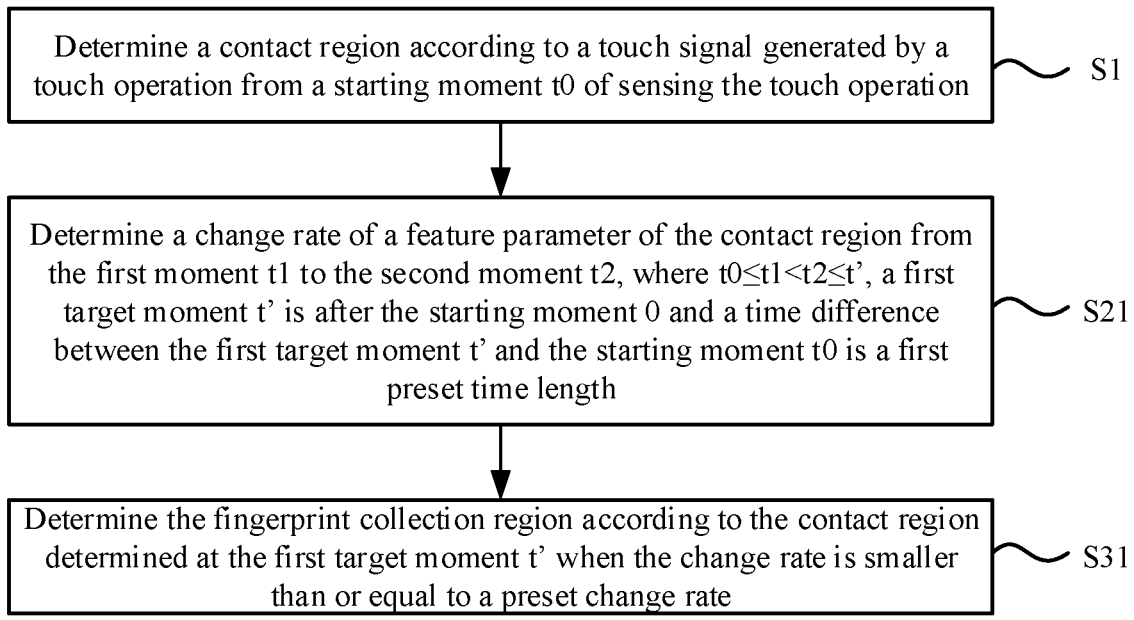
FIG. 6 is a flowchart illustrating another method of determining a fingerprint collection region according to some embodiments of the present disclosure.

FIG. 6 is a flowchart illustrating another method of determining a fingerprint collection region according to some embodiments of the present disclosure. As shown in FIG. 6, determining the change rate of the feature parameter of the contact region includes the following step S21.

At step S21, the change rate of the feature parameter of the contact region from a first moment t1 to a second moment t2 is determined, where t0≤t1<t2≤t', a first target moment t' is after the starting moment t0 and a time difference between the first target moment t' and the starting moment t0 is a first preset time length.

Determining the fingerprint collection region according to the contact region includes the following step S31.

At step S31, the fingerprint collection region is determined according to the contact region determined at the first target moment t'.

In this example, the change rate of the feature parameter of the contact region may be determined from the first moment t1 to the second moment t2 which are between t0 and t'. When the change rate is smaller than or equal to the first preset change rate, it may be determined that the area of the contact region tends to be stable. In other words, when the change rate is smaller than or equal to the first preset change rate, the area of the contact region no longer increases or increases by a small amount. Thus, the fingerprint collection region is determined according to the contact region determined at the first target moment t', that is, when the area of the contact region tends to be stable, the fingerprint collection region is determined according to the contact region when the area of the contact region between the finger of the user and the terminal device is maximum. Therefore, it may be ensured that the area of the determined fingerprint collection region is same as the maximum contact area between the finger and the terminal device when the user performs a touch operation, thereby the fingerprint information may be collected completely by starting the fingerprint identification sensors in the fingerprint collection region.

Preferably, t1 and t2 may be moments close to t'. For example, a time length from t1 to t' is smaller than or equal to ⅓ of the first preset time length, t2 is between t1 and t', and t2 may even be equal to t'.

Generally, a time length from a moment at which a finger starts to contact the terminal device to a moment at which an area of the contact region reaches the maximum area is the first preset time length. In other words, a time length from a moment at which a contact area between a finger and the terminal device is zero to a moment at which the contact area reaches the maximum area is the first preset time length. Therefore, the change rate of the contact area tends to be stable within a time range close to t', and the change rate of the contact area does not tend to be stable within a time range away from t', that is, it is highly probable that the change rate is greater than the first preset change rate.

If the change rate of the feature parameter of the contact region is determined within a time range away from t', it is highly probably concluded that the change rate of the contact area does not tend to be stable. However, since the contact area within the time range away from t' is usually unstable, the obtained conclusion that the change rate of the contact area does not tend to be stable cannot accurately reflect whether the change rate of the contact area close to t' tends to be stable.

According to this example, the change rate of the contact area is determined by selecting t1 and t2 within the time range close to t', i.e., the change rate of the feature parameter of the contact region may be determined within the time range close to t', which may accurately reflect whether the change rate of the contact area close to t' tends to be stable. Further, when the contact area tends to be stable, the fingerprint collection region is determined according to the contact region, and the fingerprint information may be collected completely by starting the fingerprint identification sensors in the fingerprint collection region.

Optionally, the first preset time length is from a moment at which a finger starts to contact the terminal device to a moment at which a contact area between the finger and the terminal device reaches a stable maximum value. The stable maximum value of the contact area may refer to an area where the contact area between the finger and the terminal device no longer increases.

In some embodiments, the first preset time length, i.e., t'-t0, may be determined by performing statistics based on big data. For example, the first preset time length may be obtained by performing statistics for a large number of time lengths, each of which is from a moment at which a finger starts to contact the terminal device to a moment at which a contact area between the finger and the terminal reaches a stable maximum value, and by calculating an average value of the large number of time lengths. For example, the first preset time length may be 300 milliseconds. That is, a time length from a moment at which a finger starts to contact the terminal device to a moment at which a contact area between the finger and the contact region reaches a stable maximum value is around 300 milliseconds.

Figure 7:
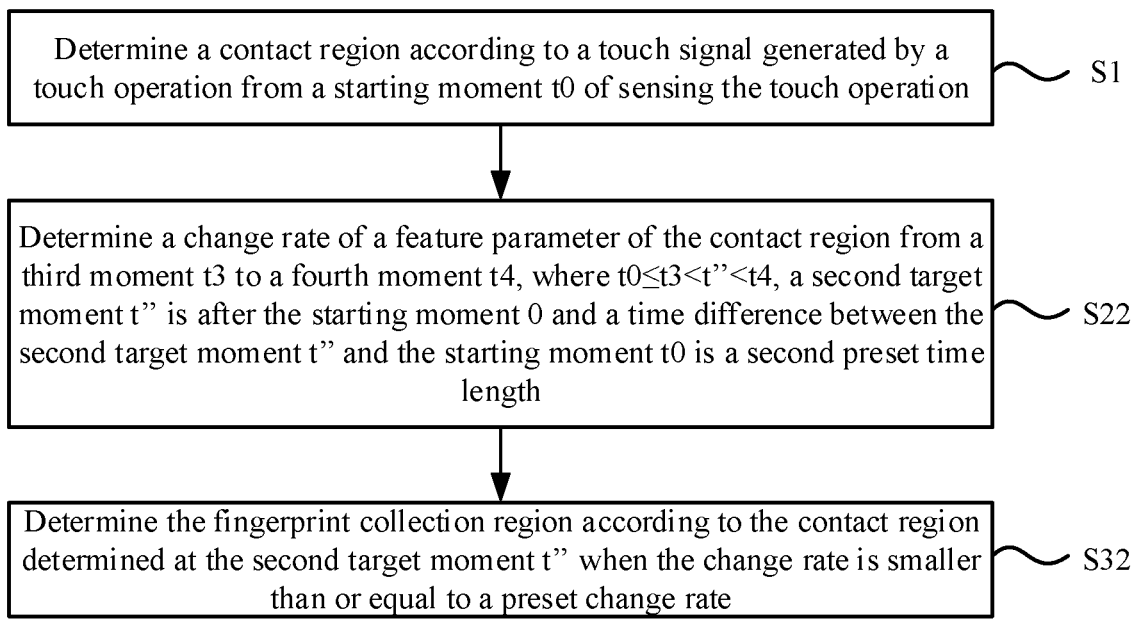
FIG. 7 is a flowchart illustrating another method of determining a fingerprint collection region according to some embodiments of the present disclosure.

FIG. 7 is a flowchart illustrating another method of determining a fingerprint collection region according to some embodiments of the present disclosure. As shown in FIG. 7, determining the change rate of the feature parameter of the contract region includes the following step S22.

At step S22, the change rate of the feature parameter of the contact region from a third moment t3 to a fourth moment t4 is determined, where t0≤t3<t"<t4, a second target moment t" is after the starting moment t0 and a time difference between the second target moment t" and the starting moment t0 is a second preset time length.

Determining the fingerprint collection region according to the contact region includes the following step S32.

At step S32, the fingerprint collection region is determined according to the contact region determined at the second target moment t".

In this example, the change rate of the feature parameter of the contact region may be determined from the third moment t3 to the fourth moment t4 respectively at two sides of t". When the change rate is smaller than or equal to a second preset change rate (the second preset change rate may be greater than or equal to the first preset change rate), it may be determined that the area of the contact region tends to be stable (by comparing the area of the contact region tending to be stable in this example with the area of the contact region tending to be stable indicated in the example shown in FIG. 6, the area of the contact region indicated in the example shown in FIG. 6 may be more stable). Therefore, the fingerprint collection region may be determined according to the contact region determined at the second target moment t". That is, when the area of the contact region tends to be stable, the fingerprint collection region is determined according to the contact region when the contact area between the finger of the user and the terminal device is larger. Thus, it may be ensured that the area of the determined fingerprint collection region is approximate to the maximum contact area between the finger and the terminal device when the user performs a touch operation, so that relatively complete fingerprint information may be collected by starting the fingerprint identification sensors in the fingerprint collection region.

Optionally, the second preset time length is from a moment at which the finger starts to contact the terminal device to a moment at which the contact area between the finger and the contact region reaches a smooth rising period. The smooth rising period refers to a moment in which the contact area still changes but with a small change rate, for example, the change rate of the contact area is smaller than a preset change rate.

In some embodiments, the second preset time length, i.e., t"-t0, may be determined by performing statistics based on big data. For example, the second preset time length may be obtained by performing statistics for a large number of time lengths, each of which is from a moment at which the finger starts to contact the terminal device to a moment at which the contact area between the finger and the terminal device reaches a smooth rising period, and by calculating an average value of the large number of time lengths. For example, the second preset time length may be 100 milliseconds. That is, a time length from a moment at which the finger starts to contact the terminal device to a moment at which the contact area between the finger and the contact region reaches a smooth rising period is around 100 milliseconds.

Figure 8:
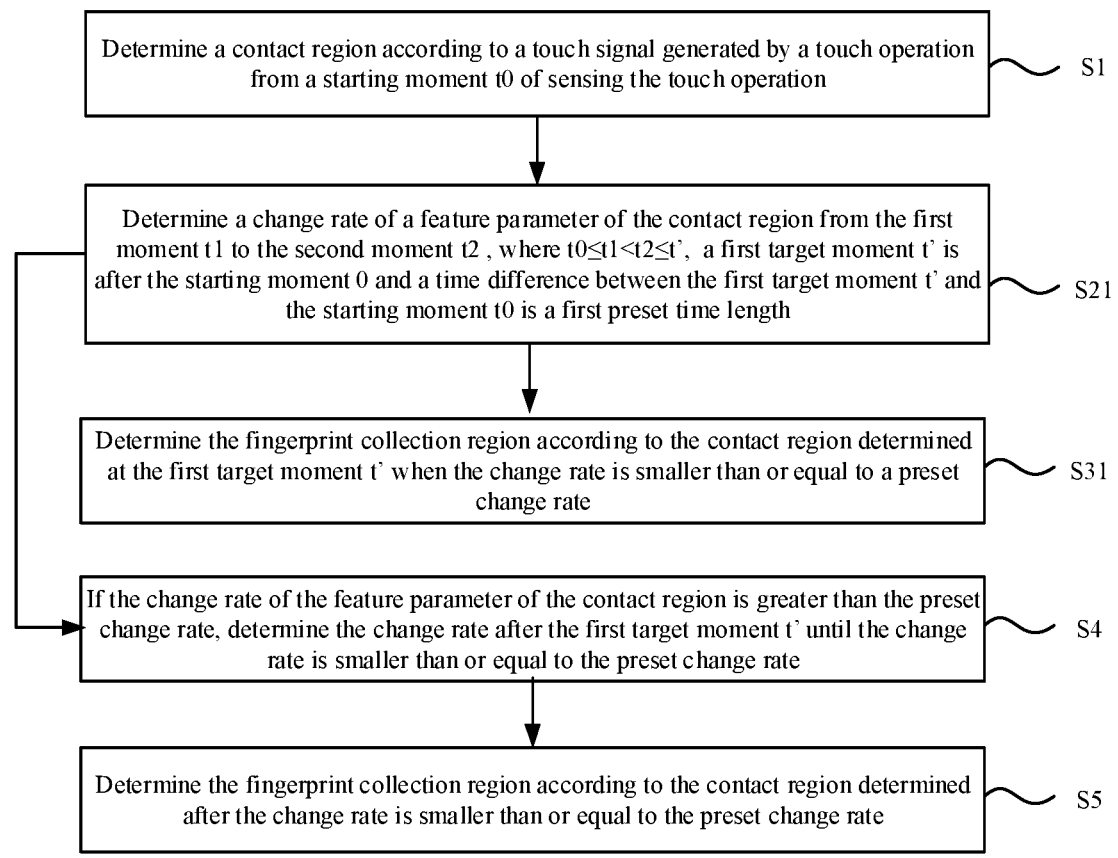
FIG. 8 is a flowchart illustrating another method of determining a fingerprint collection region according to some embodiments of the present disclosure.

FIG. 8 is a flowchart illustrating another method of determining a fingerprint collection region according to some embodiments of the present disclosure. As shown in FIG. 8, the method further includes the following steps S4-S5.

At step S4, if the change rate of the feature parameter of the contact region is greater than the preset change rate, the change rate after the first target moment t' is determined until the change rate is smaller than or equal to the preset change rate.

At step S5, the fingerprint collection region is determined according to the contact region determined after the change rate is smaller than or equal to the preset change rate.

In some embodiments, if the change rate is greater than the preset change rate, it indicates that the area of the contact region is not yet stable (for example, the user is still adjusting a posture for contacting the terminal device). In this case, it is not helpful to accurately collect a fingerprint pattern of the user.

In this example, the change rate of the area of the contact region after the first target moment t' may be determined until the change rate is smaller than or equal to the preset change rate, and the fingerprint collection region may be determined according to the contact region determined after the change rate is smaller than or equal to the preset change rate. As a result, when the area of the contact region tends to be stable, the fingerprint collection region may be determined according to the contact region, thereby ensuring that the determined contact region coincides with the contact region when the finger of the user completely presses on the terminal device. It is further ensured that the fingerprint collection region coinciding with the contact region when the finger of the user completely presses on the terminal device is determined according to the determined contact region.

Figure 9:
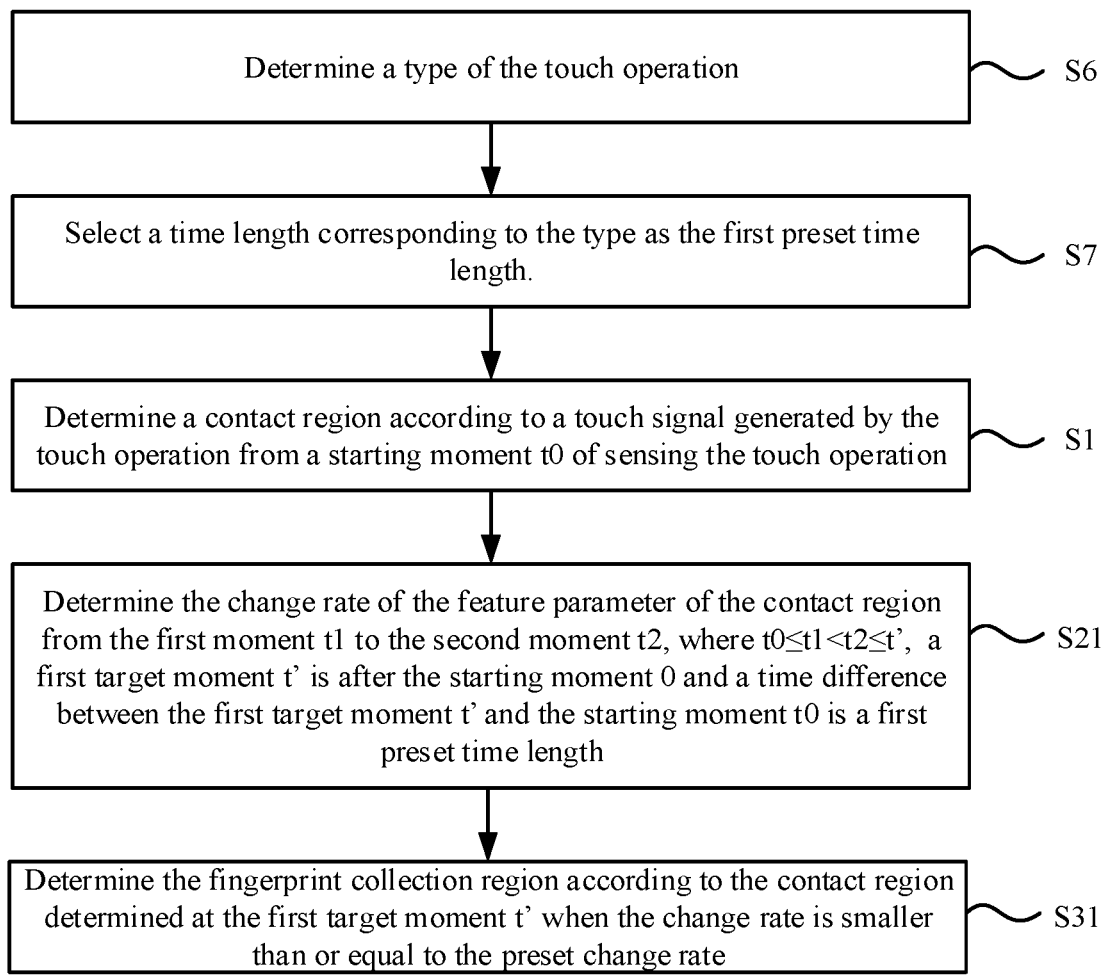
FIG. 9 is a flowchart illustrating another method of determining a fingerprint collection region according to some embodiments of the present disclosure.

FIG. 9 is a flowchart illustrating another method of determining a fingerprint collection region according to some embodiments of the present disclosure. As shown in FIG. 9, before the contact region is determined according to the touch signals, the method further includes the following steps S6-S7.

At step S6, a type of the touch operation is determined.

At step S7, a time length corresponding to the type is selected as the first preset time length.

In some embodiments, there is a first preset time length between the first target moment t' and a starting moment t0 of sensing the touch operation, in other words, from a moment when the user starts touching the terminal device, the terminal device will not collect the fingerprint pattern of the user and make response based on the collected fingerprint pattern until a delay of at least the first preset time length has passed.

However, for different types of touch operations, delays acceptable to the user are different. In the example, the type of the touch operation is determined, and the time length corresponding to the type is selected as the first preset time length. It can ensure that the selected first preset time length will be a delay suitable for the type of the touch operation, so as to maintain the user experience.

Optionally, the type includes fingerprint registration and fingerprint identification, and the first preset time length corresponding to the fingerprint registration is greater than the first preset time length corresponding to the fingerprint identification.

In some embodiments, the type of the touch operation may include fingerprint registration and fingerprint identification. Generally, a complete fingerprint pattern may be collected by registering the fingerprint of the user into the fingerprint identification sensors for multiple times, and therefore, the fingerprint registration usually takes long time. In this case, the delay tolerable by the user is longer.

For the fingerprint identification, for example, fingerprint identification for unlocking and fingerprint identification for payment which generally are all instant operations, and the user needs to quickly see an operation result. In this case, the delay tolerable by the user is generally short. Therefore, the first preset time length corresponding to the fingerprint registration may be set to be greater than the first preset time length corresponding to the fingerprint identification.

For example, the first preset time length corresponding to the fingerprint registration may be 300 milliseconds, and the first preset time length corresponding to the fingerprint identification may be 100 milliseconds.

It is to be noted that the first preset time length corresponding to the fingerprint identification in this example may be understood as the second preset time length in the above example shown in FIG. 7. Therefore, when the type of the touch operation is the fingerprint identification, the change rate of the feature parameter of the contact region may be determined based on the above example shown in FIG. 7.

Figure 10:
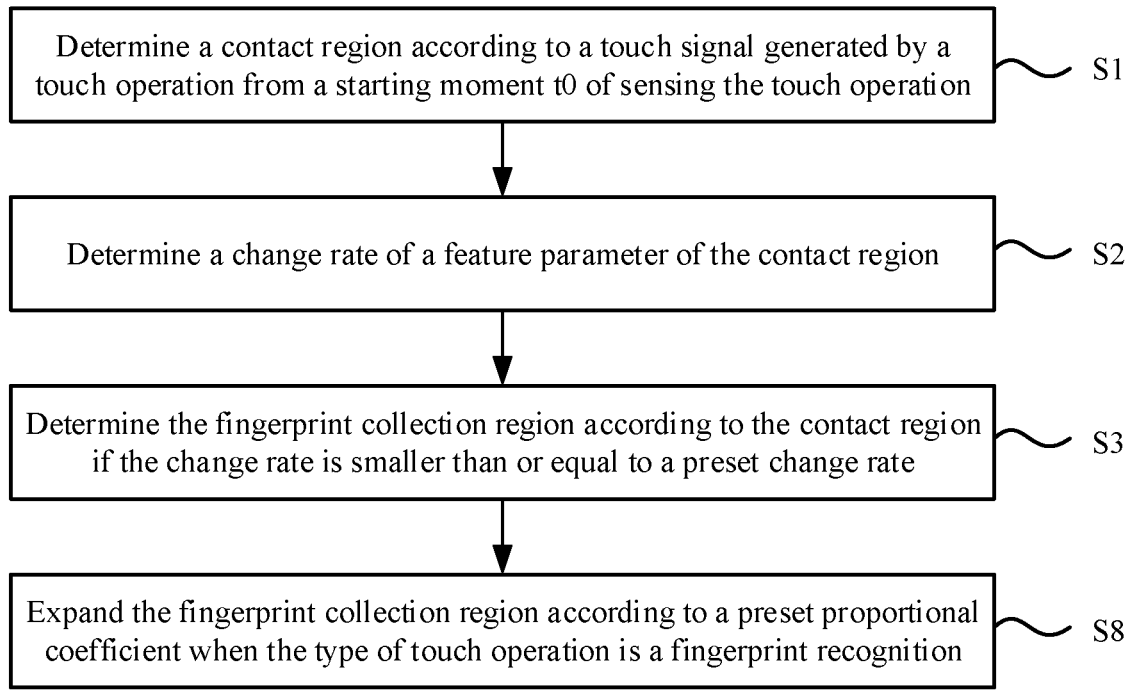
FIG. 10 is a flowchart illustrating another method of determining a fingerprint collection region according to some embodiments of the present disclosure.

FIG. 10 is a flowchart illustrating another method of determining a fingerprint collection region according to some embodiments of the present disclosure. As shown in FIG. 10, when the type of the touch operation is fingerprint identification, after the fingerprint collection region is determined according to the contact region, the method further includes the following step S8.

At step S8, the fingerprint collection region is expanded according to a preset proportional coefficient.

In some embodiments, since the first preset time length corresponding to the fingerprint registration is greater than the first preset time length corresponding to the fingerprint identification, that is, the first preset time length corresponding to the fingerprint identification is shorter. The finger of the user may fail to complete an operation from a moment at which the finger starts to contact the terminal device to a moment at which the finger contacts the terminal device completely within the shorter first preset time length.

For example, the first preset time length corresponding to the fingerprint identification is 100 milliseconds, and the time length required from a moment at which the finger starts to contact the terminal device to a moment at which the finger contacts the terminal device completely is 300 milliseconds. After the finger of the user starts contacting the terminal device for 100 milliseconds, the finger does not completely contact the terminal device, that is, the contact area is smaller than the contact area of completely contacting the terminal device. Therefore, the fingerprint collection region may be expanded according to the preset proportional coefficient, thereby collecting more complete fingerprint pattern of the user.

For example, when the finger of the user starts contacting the terminal device and maintains the contact for 100 milliseconds, the contact area between the finger and the terminal device is A; and when the finger of the user starts contacting the terminal device and maintains the contact for 300 milliseconds, the contact area between the finger and the terminal device is 112% A. In this case, after the finger starts contacting the terminal device for 100 milliseconds, the major axis and the minor axis of the contact region may be expanded respectively so that the area of the expanded contact region is 1.12 times of the contact area before expansion.

Optionally, the method further includes:

if the change rate of the feature parameter of the contact region is greater than another preset change rate (a second preset change rate), determining the change rate after the fourth moment t4 until the change rate is smaller than or equal to the preset change rate; and determining the fingerprint collection region according to the contact region determined after the change rate is smaller than or equal to the preset change rate.

Optionally, before the contact region is determined according to the touch signals, the method may further include:

determining a type of the touch operation; and selecting a time length corresponding to the type as the second preset time length.

Optionally, the type includes fingerprint registration and fingerprint identification, and the second preset time length corresponding to the fingerprint registration is greater than the second preset time length corresponding to the fingerprint identification.

Corresponding to the foregoing examples of methods of determining a fingerprint collection region, the present disclosure further provides examples of apparatuses for determining a fingerprint collection region.

Figure 11:
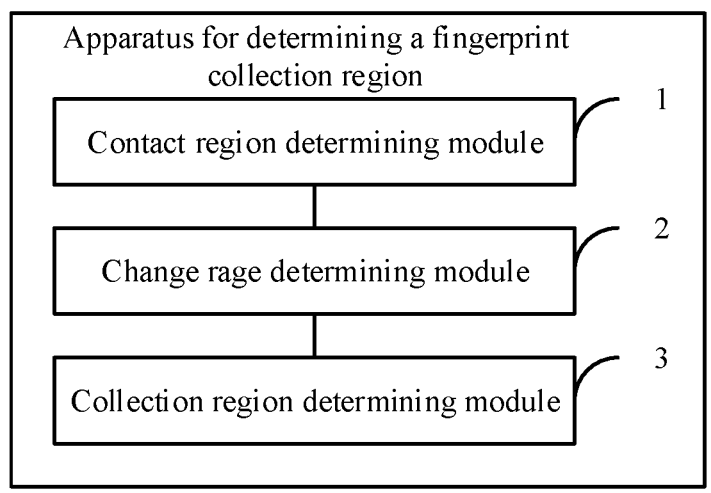
FIG. 11 is a block diagram illustrating an apparatus for determining a fingerprint collection region according to some embodiments of the present disclosure.

FIG. 11 is a block diagram illustrating an apparatus for determining a fingerprint collection region according to some embodiments of the present disclosure. The apparatus for determining a fingerprint collection region according to some embodiments of the present disclosure may be applied to a terminal device such as a mobile phone, a tablet computer and a wearable device. The terminal device includes a touching circuit and a fingerprint identifying circuit. The touching circuit may include a plurality of touch sensors and a touch processor, and the fingerprint identifying circuit may include a plurality of fingerprint identification sensors and fingerprint identification processors.

The touch sensors include but are not limited to mutual-inductive capacitive sensors and self-inductive capacitive sensors, and a specific type of the sensors may be selected according to requirements. The fingerprint identification sensors include but are not limited to photosensors and ultrasonic sensors, and a specific type of the sensors may be selected according to requirements.

In some embodiments, the terminal device may further include a display panel having touch sensors and the fingerprint identification sensors thereon.

It is to be noted that a region where the fingerprint identification sensors are disposed in some embodiments of the present disclosure may be far larger than a region where the fingerprint identification sensors are disposed in the related art.

As shown in FIG. 11, the apparatus for determining a fingerprint collection region includes:

a contact region determining module 1, configured to determine a contact region according to a touch signal generated by a touch operation from a starting moment t0 of sensing the touch operation;

a change rate determining module 2, configured to determine a change rate of a feature parameter of the contact region; and a collection region determining module 3, configured to determine the fingerprint collection region according to the contact region when the change rate is smaller than or equal to a preset change rate.

Optionally, the feature parameter of the contact region is used to represent the area of the contact region.

Optionally, the change rate determining module 2 is configured to determine the change rate of the feature parameter of the contact region from a first moment t1 to a second moment t2, where $t0 \leq t1 < t2 \leq t'$, a first target moment t' is after the starting moment t0 and a time difference between the first target moment t' and the starting moment t0 is a first preset time length.

The collection region determining module 3 is configured to determine the fingerprint collection region according to the contact region determined at the first target moment t' when the change rate is smaller than or equal to a first preset change rate.

Optionally, the first preset time length is from a moment at which a finger starts to contact the terminal device to a moment at which a contact area between the finger and the terminal device reaches a stable maximum value.

The change rate determining module 2 is configured to determine the change rate of the feature parameter of the contact region from a third moment t3 to a fourth moment t4, where $t0 \leq t3 < t'' < t4$, a second target moment t'' is after the starting moment t0 and a time difference between the second target moment t'' and the starting moment t0 is a second preset time length.

The collection region determining module 3 is configured to determine the fingerprint collection region according to the contact region determined at the second target moment t'' when the change rate is smaller than or equal to a second preset change rate.

Optionally, the second preset time length is from a moment at which the finger starts to contact the terminal device to a moment at which the contact area between the finger and the terminal device reaches a smooth rising period.

Optionally, the change rate determining module 2 is further configured to, when the change rate of the area of the contact region is greater than the preset change rate, determine the change rate after the first target moment t' until the change rate is smaller than or equal to the preset change rate.

The collection region determining module 3 is further configured to determine the fingerprint collection region according to the contact region determined after the change rate is smaller than or equal to the preset change rate.

Figure 12:
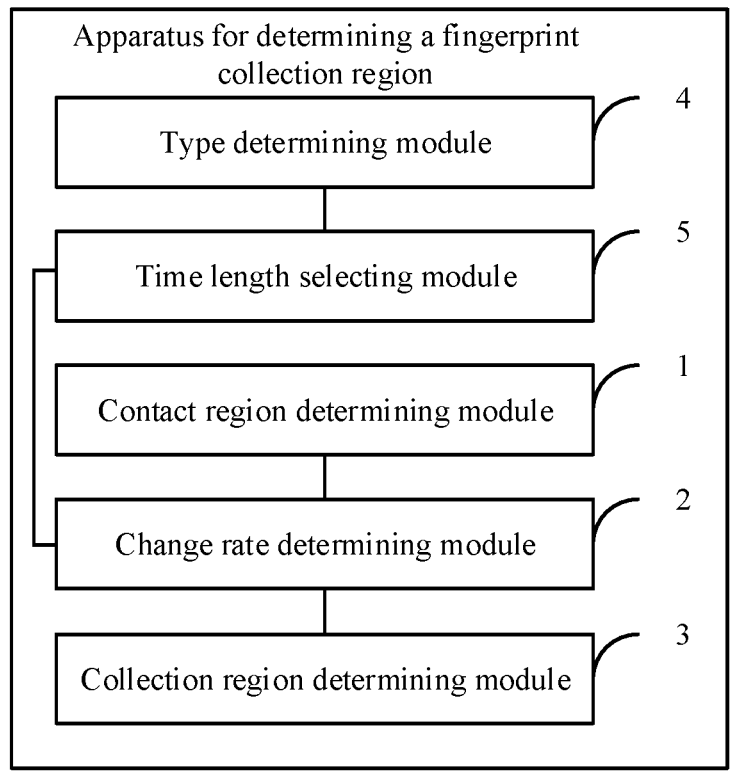
FIG. 12 is a block diagram illustrating another apparatus for determining a fingerprint collection region according to some embodiments of the present disclosure.

FIG. 12 is a block diagram illustrating another apparatus for determining a fingerprint collection region according to some embodiments of the present disclosure. As shown in FIG. 12, the apparatus further includes:

a type determining module 4, configured to determine a type of the touch operation; and a time length selecting module 5, configured to select a time length corresponding to the type as the first preset time length.

Optionally, the type includes fingerprint registration and fingerprint identification, and the first preset time length corresponding to the fingerprint registration is greater than the first preset time length corresponding to the fingerprint identification.

Figure 13:
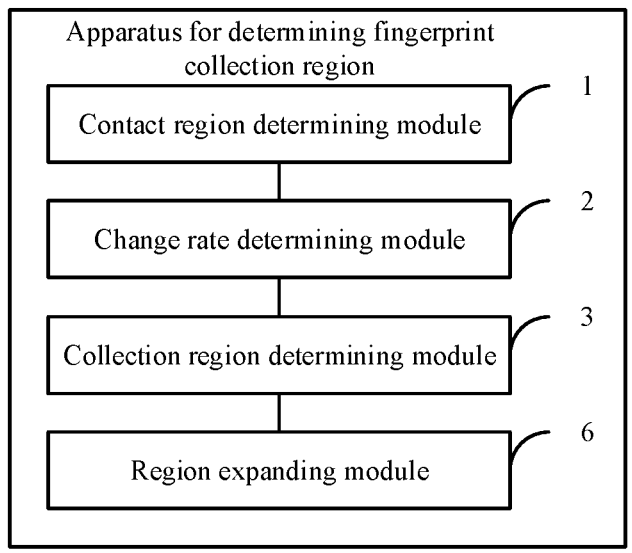
FIG. 13 is a block diagram illustrating another apparatus for determining a fingerprint collection region according to some embodiments of the present disclosure.

FIG. 13 is a block diagram illustrating another apparatus for determining a fingerprint collection region according to some embodiments of the present disclosure. As shown in FIG. 13, when the type of the touch operation is the fingerprint identification, the apparatus further includes:

a region expanding module 6, configured to expand the fingerprint collection region according to a preset proportional coefficient.

A specific manner in which each module of the apparatus in the above example performs an operation has been already described in detail in the relevant method examples, details of which will not be repeated herein.

Optionally, the apparatus may further include:

a fingerprint collection region determining module, configured to, when the change rate of the feature parameter of the contact region is greater than the preset change rate, determine the change rate after the fourth moment t4 until the change rate is smaller than or equal to another preset change rate (the second preset change rate), determine the fingerprint collection region according to the contact region determined after the change rate is smaller than or equal to the preset change rate.

Optionally, the apparatus may further include:

a second preset time length determining module, configured to determine a type of the touch operation and select a time length corresponding to the type as the second preset time length.

Optionally, the type includes fingerprint registration and fingerprint identification, and the second preset time length corresponding to the fingerprint registration is greater than the second preset time length corresponding to the fingerprint identification.

For the apparatus examples, since it basically corresponds to the method examples, reference may be made to the partial description of the method examples. The apparatus examples described above are merely illustrative, where the modules described as separate components may be or not be physically separate, and the components displayed as modules may or may not be physical modules, that is., may be located at one place, or may also be distributed to multiple network modules. Some or all of the modules may be selected according to actual needs to achieve the objectives of the present disclosure. It can be understood and implemented by those of ordinary skill in the art without any creative effort.

Some embodiments of the present disclosure further provide an electronic device. The electronic device includes:

one or more processors; and a memory for storing processor executable instructions.

The one or more processors are configured to execute steps of the method in any one of the examples described above.

Some embodiments of the present disclosure further provide a computer readable storage medium storing computer programs. The programs are executed by the processor to implement steps of the method in any one of the examples described above.

Figure 14:
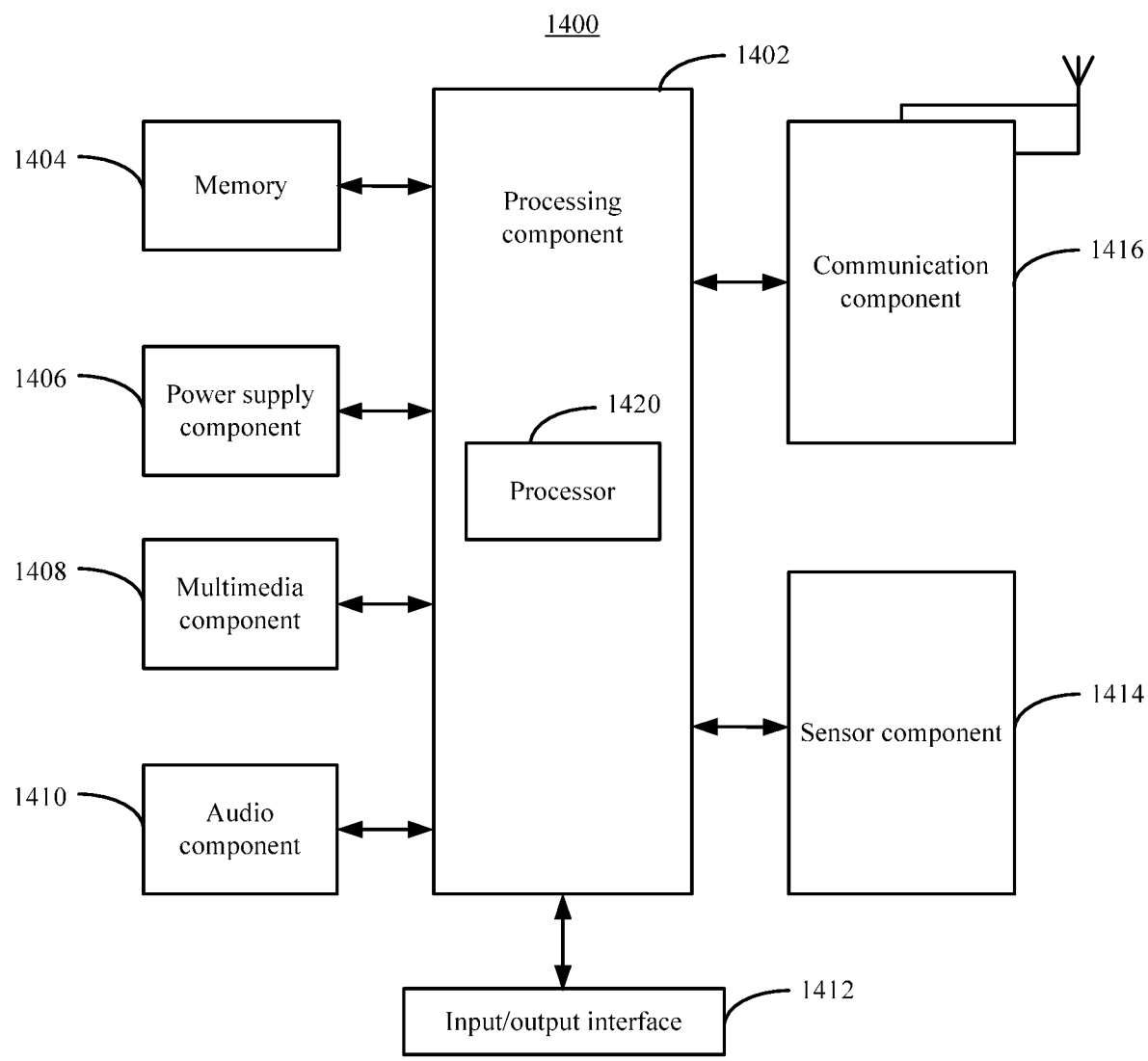
FIG. 14 is a block diagram illustrating an apparatus for determining a fingerprint collection region according to some embodiments of the present disclosure.

FIG. 14 is a block diagram illustrating an apparatus 1400 for determining a fingerprint collection region according to some embodiments of the present disclosure. For example, the apparatus 1400 may include a mobile phone, a computer, a digital broadcast terminal, a message transceiving device, a game console, a tablet device, a medical device, a fitness device, a personal digital assistant, and the like.

As shown in FIG. 14, the apparatus 1400 may include one or more of the following components: a processing component 1402, a memory 1404, a power supply component 1406, a multimedia component 1408, an audio component 1410, an input/output (I/O) interface 1412, a sensor component 1414, and a communication component 1416.

The processing component 1402 generally controls overall operations of the apparatus 1400, such as operations associated with display, phone calls, data communications, camera operations and record operations. The processing component 1402 may include one or more processors 1420 to execute instructions to complete all or a part of steps of the above method. Further, the processing component 1402 may include one or more modules which facilitate the interaction between the processing component 1402 and other components. For example, the processing component 1402 may include a multimedia module to facilitate the interaction between the multimedia component 1408 and the processing component 1402.

The memory 1404 is to store various types of data to support operations on the apparatus 1400. Examples of such data include instructions for any application or method that operates on the apparatus 1400 contact data, phonebook data, messages, pictures, videos, and so on. The memory 1404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1406 supplies power for different components of the apparatus 1400. The power supply component 1406 may include a power supply management system, one or more power supplies, and other association components for generating, managing and distributing power for the apparatus 1400.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

The multimedia component 1408 includes a screen providing an output interface between the apparatus 1400 and a user. In some examples, the screen may include a Liquid Crystal Display (LCD) and a Touch Panel (TP). In some embodiments, an organic light-emitting diode (OLED) display or other types of displays can be adopted.

If the screen includes the touch panel, the screen may be implemented as a touch screen to receive input signals from a user. The touch panel may include one or more touch sensors to sense a touch, a slide and a gesture on the touch panel. The touch sensors may not only sense a boundary of a touch or swipe, but also sense a duration and a pressure associated with the touch or swipe. In some examples, the multimedia component 1408 may include a front camera and/or a rear camera. The front camera and/or rear camera may receive external multimedia data when the apparatus 1400 is in an operation mode, such as a photographing mode or a video mode. Each of the front camera and the rear camera may be a fixed optical lens system or have focal length and optical zooming capability.

The audio component 1410 is to output and/or input an audio signal. For example, the audio component 1410 includes a microphone (MIC). When the apparatus 1400 is in an operable mode, such as a call mode, a record mode and a voice identification mode, the microphone is configured to receive an external audio signal. The received audio signal may be further stored in the memory 1404 or sent via the communication component 1416. In some examples, the audio component 1410 further includes a speaker for outputting an audio signal.

The I/O interface 1412 provides an interface between the processing component 1402 and a peripheral interface module. The above peripheral interface module may be a keyboard, a click wheel, a button, or the like. These buttons may include but are not limited to, a home button, a volume button, a start button and a lock button.

The sensor component 1414 includes one or more sensors to provide a status assessment of various aspects for the apparatus 1400. For example, the sensor component 1414 may detect an on/off state of the apparatus 1400 and a relative positioning of components. For example, the components are a display and a keypad of the apparatus 1400. The sensor component 1414 may also detect in position of the apparatus 1400 or a component of the apparatus 1400, a presence or absence of a contact between a user and the apparatus 1400, an orientation or acceleration/deceleration of the apparatus 1400, and a change in temperature of the apparatus 1400. The sensor component 1414 may include a proximity sensor to detect the presence of a nearby object without any physical touch. The sensor component 1414 may further include an optical sensor, such as a Complementary Metal-Oxide-Semiconductor (CMOS) or Charged Coupled Device (CCD) image sensor which is used in imaging applications. In some examples, the sensor component 1414 may further include an acceleration sensor, a gyro sensor, a magnetic sensor, a pressure sensor, or a temperature sensor.

The communication component 1416 is to facilitate wired or wireless communication between the apparatus 1400 and other devices. The apparatus 1400 may access a wireless network based on a communication standard, such as WiFi, 2G or 3G, 4G LTE, 5G NR or a combination thereof. In some embodiments, the communication component 1416 receives a broadcast signal or broadcast related information from an external broadcast management system via a broadcast channel. In some embodiments, the communication component 1416 may further include a Near Field Communication (NFC) module for promoting short-range communication. For example, the NFC module may be implemented based on radio frequency identification (RFID) technology, infrared data association (IrDA) technology, ultra-wideband (UWB) technology, Bluetooth (BT) technology and other technology.

In some embodiments, the apparatus 1400 may be implemented by one or more of application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the method in any one of the examples described above.

In some embodiments, there is further provided a non-transitory computer readable storage medium including instructions, such as the memory 1404 including instructions. The above instructions may be executed by the processor 1420 of the apparatus 1400 to complete the above method. For example, the non-transitory computer readable storage medium may be a Read-Only Memory (ROM), a Random-Access Memory (RAM), a CD-ROM, a magnetic tape, a floppy disk and an optical data storage device, etc.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HIVID) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of determining a fingerprint collection region, the method being applied to a terminal device, and comprising:

determining a contact region according to a touch signal generated by a touch operation from a starting moment t0 of sensing the touch operation;

determining a change rate of a feature parameter of the contact region; and determining the fingerprint collection region according to the contact region when the change rate is smaller than or equal to a preset change rate;

wherein said determining the change rate of the feature parameter of the contact region comprises:

determining the change rate of the feature parameter of the contact region from a first moment t1 to a second moment t2, wherein $t0 \leq t1 < t2 \leq t'$, a first target moment t' is after the starting moment t0 and a time difference between the first target moment t' and the starting moment t0 is a first preset time length; and wherein said determining the fingerprint collection region according to the contact region comprises:

determining the fingerprint collection region according to the contact region determined at the first target moment t'.

2. The method according to claim 1, wherein the feature parameter is used to represent an area of the contact region.

3. The method according to claim 1, wherein the first preset time length is from a moment at which a finger starts to contact the terminal device to a moment at which a contact area between the finger and the terminal device reaches a stable maximum value.

4. The method according to claim 1, wherein determining the change rate of the feature parameter of the contact region comprises:

determining the change rate of the feature parameter of the contact region from a third moment t3 to a fourth moment t4, wherein $t0 \leq t3 < t'' < t4$, a second target moment t'' is after the starting moment t0 and a time difference between the second target moment t'' and the starting moment t0 is a second preset time length; and wherein determining the fingerprint collection region according to the contact region comprises:

determining the fingerprint collection region according to the contact region determined at the second target moment t''.

5. The method according to claim 4, wherein the second preset time length is from a moment at which a finger starts to contact the terminal device to a moment at which a contact area between the finger and the terminal device reaches a smooth rising period.

6. The method according to claim 1, further comprising:

when the change rate of the feature parameter of the contact region is greater than the preset change rate, determining the change rate after the first target moment t' until the change rate is smaller than or equal to the preset change rate; and determining the fingerprint collection region according to the contact region determined after the change rate is smaller than or equal to the preset change rate.

7. The method according to claim 1, wherein the method further comprises:

determining a type of the touch operation; and selecting a time length corresponding to the type as the first preset time length.

8. The method according to claim 7, wherein the type comprises fingerprint registration and fingerprint identification, and the first preset time length corresponding to the fingerprint registration is greater than the first preset time length corresponding to the fingerprint identification.

9. The method according to claim 1, wherein when the type of the touch operation is the fingerprint identification, the method further comprises:
- expanding the fingerprint collection region according to a preset proportional coefficient.

10. An electronic device, comprising:
- one or more processors; and
- a memory for storing processor executable instructions,
- wherein when the instructions are invoked, the one or more processors are configured to:
  - determine a contact region according to a touch signal generated by a touch operation from a starting moment t0 of sensing the touch operation;
  - determine a change rate of a feature parameter of the contact region; and
  - determine the fingerprint collection region according to the contact region when the change rate is smaller than or equal to a preset change rate;
  - wherein when determining the change rate of the feature parameter of the contact region, the one or more processors are configured to:
    - determine the change rate of the feature parameter of the contact region from a first moment t1 to a second moment t2, wherein t0≤t1<t2≤t', a first target moment t' is after the starting moment t0 and a time difference between the first target moment t' and the starting moment t0 is a first preset time length; and
  - wherein when determining the fingerprint collection region according to the contact region, the one or more processors are configured to:
    - determine the fingerprint collection region according to the contact region determined at the first target moment t'.

11. The electronic device according to claim 10, wherein the feature parameter is used to represent an area of the contact region.

12. The electronic device according to claim 10, wherein the first preset time length is from a moment at which a finger starts to contact the terminal device to a moment at which a contact area between the finger and the terminal device reaches a stable maximum value.

13. The electronic device according to claim 10, wherein when determining the change rate of the feature parameter of the contact region, the one or more processors are configured to:
  - determine the change rate of the feature parameter of the contact region from a third moment t3 to a fourth moment t4, wherein t0≤t3<t"<t4, a second target moment t" is after the starting moment t0 and a time difference between the second target moment t" and the starting moment t0 is a second preset time length; and
  - wherein when determining the fingerprint collection region according to the contact region, the one or more processors are configured to:
    - determine the fingerprint collection region according to the contact region determined at the second target moment t".

14. The electronic device according to claim 13, wherein the second preset time length is from a moment at which a finger starts to contact the terminal device to a moment at which a contact area between the finger and the terminal device reaches a smooth rising period.

15. The electronic device according to claim 10, wherein the one or more processors are further configured to:
  - when the change rate of the feature parameter of the contact region is greater than the preset change rate, determine the change rate after the first target moment t' until the change rate is smaller than or equal to the preset change rate; and
  - determine the fingerprint collection region according to the contact region determined after the change rate is smaller than or equal to the preset change rate.

16. The electronic device according to claim 10, wherein the one or more processors are further configured to:
  - determine a type of the touch operation; and
  - select a time length corresponding to the type as the first preset time length.

17. The electronic device according to claim 16, wherein the type comprises fingerprint registration and fingerprint identification, and the first preset time length corresponding to the fingerprint registration is greater than the first preset time length corresponding to the fingerprint identification.

18. A non-transitory computer readable storage medium storing computer programs, wherein the programs are executed by one or more processors to:
  - determine a contact region according to a touch signal generated by a touch operation from a starting moment t0 of sensing the touch operation;
  - determine a change rate of a feature parameter of the contact region; and
  - determine the fingerprint collection region according to the contact region when the change rate is smaller than or equal to a preset change rate;
  - wherein when determining the change rate of the feature parameter of the contact region, the programs are executed by the one or more processors to:
    - determine the change rate of the feature parameter of the contact region from a first moment t1 to a second moment t2, wherein t0≤t1<t2≤t', a first target moment t' is after the starting moment t0 and a time difference between the first target moment t' and the starting moment t0 is a first preset time length; and
  - wherein when determining the fingerprint collection region according to the contact region, the programs are executed by the one or more processors to:
    - determine the fingerprint collection region according to the contact region determined at the first target moment t'.

* * * * *